US011997144B2

(12) United States Patent
Condoluci et al.

(10) Patent No.: US 11,997,144 B2
(45) Date of Patent: May 28, 2024

(54) CONNECTIVITY CONTROL FOR PLATOONING OF USER EQUIPMENTS

(71) Applicant: Telefonaktiebolaget LM Ericsson (publ), Stockholm (SE)

(72) Inventors: Massimo Condoluci, Solna (SE); Thorsten Lohmar, Aachen (DE); Stefano Sorrentino, Solna (SE); Marco Belleschi, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 456 days.

(21) Appl. No.: 17/277,589

(22) PCT Filed: Sep. 24, 2018

(86) PCT No.: PCT/IB2018/057370
§ 371 (c)(1),
(2) Date: Mar. 18, 2021

(87) PCT Pub. No.: WO2020/065369
PCT Pub. Date: Apr. 2, 2020

(65) Prior Publication Data
US 2022/0030038 A1   Jan. 27, 2022

(51) Int. Cl.
*H04W 4/00* (2018.01)
*G08G 1/00* (2006.01)
(Continued)

(52) U.S. Cl.
CPC ........... *H04L 65/1063* (2013.01); *G08G 1/22* (2013.01); *H04L 65/1069* (2013.01);
(Continued)

(58) Field of Classification Search
None
See application file for complete search history.

(56) References Cited

U.S. PATENT DOCUMENTS 8,712,391 B2 * 4/2014 Patel ................... H04L 12/1822
455/518
10,554,521 B1 * 2/2020 Terechko ............ H04L 43/0835
(Continued)

OTHER PUBLICATIONS

International Search Report and Written Opinion of the International Searching Authority, PCT/IB2018/057370, dated Dec. 4, 2019, 13 pages.
(Continued)

*Primary Examiner* — Bob A Phunkulh
(74) *Attorney, Agent, or Firm* — Sage Patent Group

(57) ABSTRACT

A method by a network node controls connectivity of UEs by identifying a group of UEs for communication with an application controlling parameters used by the UEs for operation in a vehicle platoon. The method controls connectivity for a UE in the group with a RAN node responsive to characteristics of the other UEs in the group. For each of the UEs the characteristic relates to functional operation of the UE with the application. Another method by an application server identifies the group of UEs, and identifies a characteristic of each of the UEs with the application. A message identifying the group of UEs and their characteristics is communicated to a network node for controlling connectivity for individual UEs in the group with a RAN node responsive to the characteristics of the other UEs in the group.

18 Claims, 7 Drawing Sheets

(51) Int. Cl.

| | |
|---|---|
| *H04L 65/1063* | (2022.01) |
| *H04L 65/1069* | (2022.01) |
| *H04L 65/611* | (2022.01) |
| *H04W 4/02* | (2018.01) |
| *H04W 4/08* | (2009.01) |
| *H04W 4/44* | (2018.01) |
| *H04W 4/46* | (2018.01) |
| *H04W 76/14* | (2018.01) |

(52) U.S. Cl.
CPC .......... *H04L 65/611* (2022.05); *H04W 4/025* (2013.01); *H04W 4/08* (2013.01); *H04W 4/44* (2018.02); *H04W 4/46* (2018.02); *H04W 76/14* (2018.02)

(56) References Cited

U.S. PATENT DOCUMENTS

| | | | | |
|---|---|---|---|---|
| 11,665,284 | B2* | 5/2023 | Jorasch | H04N 21/44008 709/204 |
| 2008/0155689 | A1* | 6/2008 | Denninghoff | H04W 12/126 455/518 |
| 2008/0167774 | A1* | 7/2008 | Patel | G08G 1/20 701/1 |
| 2012/0149348 | A1* | 6/2012 | Patel | H04L 12/1822 455/416 |
| 2015/0289115 | A1* | 10/2015 | Abplanalp | H04M 3/42348 455/519 |
| 2015/0358403 | A1* | 12/2015 | Bodström | H04L 67/1051 709/209 |
| 2017/0289864 | A1* | 10/2017 | Narasimha | H04W 36/0009 |
| 2018/0278385 | A1* | 9/2018 | Wu | H04J 11/005 |
| 2018/0279096 | A1* | 9/2018 | Wu | H04W 72/121 |
| 2019/0246303 | A1* | 8/2019 | Alieiev | H04W 24/08 |
| 2019/0250639 | A1* | 8/2019 | Xu | G08G 1/096725 |
| 2019/0261260 | A1* | 8/2019 | Dao | H04W 40/20 |
| 2019/0306678 | A1* | 10/2019 | Byun | H04W 88/04 |
| 2019/0392091 | A1* | 12/2019 | Kliemann | G06F 30/20 |
| 2020/0021451 | A1* | 1/2020 | Pinheiro | H04W 4/40 |
| 2020/0080853 | A1* | 3/2020 | Tam | G05D 1/0276 |
| 2020/0296762 | A1* | 9/2020 | Sun | H04W 72/046 |
| 2020/0349850 | A1* | 11/2020 | Park | H04W 4/46 |
| 2020/0361503 | A1* | 11/2020 | Teshima | B61L 27/70 |
| 2021/0084460 | A1* | 3/2021 | Yang | G08G 1/22 |
| 2021/0144524 | A1* | 5/2021 | Byun | H04B 7/0695 |
| 2021/0314774 | A1* | 10/2021 | Van Phan | H04W 12/08 |

OTHER PUBLICATIONS

Huawei et al., 3GPP TSG-SA WG6 Meeting #22, S6-180416 (revision of S6-180338), "Proposal for Solution to KI#2—Monitoring Network Situation and QoS by V2X Application," XP051411870, Sophia Antipolis, France, Mar. 5-9, 2018, 4 pages.

Huawei et al., 3GPP TSG-SA WG6 Meeting #25, S6-181156 (revision of S6-181103) "Proposal for solution for key issue on QoE monitoring," XP051545092, Sophia Antipolis, France, Jul. 23-27, 2018, 2 pages.

Ericsson, 3GPP TSG-SA WG6 Meeting #24, S6-180955 (revision of S6-180923), "New Key Issue on Network Assistance for Enhancing QoE in V2X Applications", XP051503606, Osaka, Japan, May 21-25, 2018, 2 pages.

3GPP TR 23.795 V16.1.0, "Study on Application Layer Support for V2X Services", (Release 16), Technical Specification Group Services and System Aspects, XP051475229, Valbonne, France, Dec. 2018, 77 pages.

* cited by examiner

CONNECTIVITY CONTROL FOR PLATOONING OF USER EQUIPMENTS

CROSS REFERENCE TO RELATED APPLICATIONS

This application is a 35 U.S.C. § 371 national stage application of PCT International Application No. PCT/IB2018/057370 filed on Sep. 24, 2018, the disclosure and content of which is incorporated by reference herein in its entirety.

TECHNICAL FIELD

The present disclosure relates to methods and operations by network nodes and application servers in a communications system for controlling connectivity of user equipments.

BACKGROUND

Networks nodes of radio communications systems manage user equipment (UE) connections on a per-UE basis, meaning that the network node runs separate procedures related to connection management (bearer/PDU-session establishment and management, QoS handling, admission control, etc.) for each UE connected to a radio access network. In particular, eNB admission control procedures can operate on two levels, which are a UE level and a bearer level. For example, a UE may be rejected in case the number of UE contexts that the eNB can handle in a digital unit exceeds a certain limit, or there are no resources to maintain a control plane connection, e.g. lack of signaling radio bearer (SRB) resources. In contrast, a UE may be admitted but radio bearer connection establishment may be rejected depending on the required Quality of Service (QoS) requirements, e.g. on the basis of the available physical layer resources (e.g. Physical Resource Blocks (PRBs), Physical Uplink Control Channel (PUCCH) resources, Control Channel Elements (CCEs), etc.), or a Data Radio Bearer (DRB) demanding a certain guaranteed bit rate may be rejected to avoid excessive penalization towards other UEs already admitted in the system. eNB admission control schemes may also consider a UE's priorities and privileges. For example, the eNB may preempt certain non-privileged UEs to make room for a privileged UE, such as a UE performing an emergency call.

There are group-oriented (Multimedia Broadcast/Multicast Service (MBMS)) services in radio communications systems, which cover the case when multiple UEs are interested in receiving the same content. The network has procedures for UEs to subscribe and join a group and to manage the data delivery to the group of UEs. In this case, the group is considered only from a data delivery point of view, i.e., the only purpose for group formation is to allow the reception of a certain content to all UEs belonging the group. In this case, each UE may have its own control plane connectivity towards the eNB but for group data delivery the network could establish only one group bearer/PDU-session to deliver data simultaneously to the group of UEs. Similar to unicast connections described above, also for MBMS service provisioning, the eNB may perform admission control on the MBMS bearers, i.e. depending on physical resource availability and eNB computational limitations, certain MBMS radio bearers may be rejected.

There are some other procedures where the network considers UEs grouped for control purposes, i.e., group paging and group handover. In the first case, the network is aware that a group of UEs needs to be paged simultaneously for data reception, while the reception of data will be handled independently for each UE; this is useful for machine-type communications in order to reduce control-plane signaling. In the second case, the network is aware that a group of UEs needs to perform handover simultaneously, while other procedures (such as QoS adaptation, etc.) are still managed on a per-UE basis; this is useful for some vehicular applications to reduce control-plane signaling and reduce latency in performing handover.

SUMMARY

In known communication systems, even if a network node is aware that some UEs are grouped for some particular aspects (i.e., data reception, paging, handover), the network still performs functions including admission control, bearer/PDU-session establishment and modification, and QoS handling on a per-UE basis without considering how the network will provide that function for any other UEs. When, for example, UEs are traveling in a platoon of vehicles, issues with the connectivity of one of the UEs in the platoon might create serious operational issues for how the UEs in the platoon are managed. With existing network nodes where the connectivity is managed on a per-UE basis, the network node is not aware that a certain group of UEs belongs to the same group from an application operational standpoint. Consequently, whenever the network node takes a decision for a UE (e.g., bearer or PDU-session rejection or QoS modification), if the UE belongs to a group such decision might create operational instability among the group of UEs with corresponding negative effects that can include interruption of the communications among the UEs in the group or removing some of the UEs from the group.

Various embodiments disclosed herein can improve connectivity management for UEs that have been determined to be grouped by their need to communicate with a same application being executed by an application server, and result in improved operational stability among the UEs and management efficiency.

One embodiment is directed to a method by a network node of a communications system for controlling connectivity of user equipments that will operate within a vehicle platoon. The method includes identifying a group of UEs that will communicate with an application being executed by an application server which controls parameters used by the group of UEs for operation in the vehicle platoon. The method controls connectivity for one of the UEs in the group with a radio access network node responsive to characteristics of the other UEs in the group. For each of the UEs the characteristic relates to a functional operation of the UE with respect to the application.

Accordingly, connectivity of each of the UEs to the radio access network node is controlled responsive to characteristics of the other UEs in the group. A potential advantage of these network node operations is that the connectivity operation can be performed with awareness by the network node of its effect on stability and operation of all of the UEs within the group and can enable the network node to control connectivity while avoiding negative effects such as interruption of the communications among the grouped UEs or loss of some of the UEs from the group.

In a further embodiment, the method to control connectivity includes, for each of the UEs in the group, controlling admission of the UE to utilize radio resources of the radio access network node for communication with the application responsive to the characteristics of the other UEs in the group.

In a further alternative embodiment, the method to control connectivity includes controlling establishment of a group bearer and/or PDU session between the radio access network node and the application server that is executing the application for use in carrying communications between the UEs and the application, responsive to the characteristics of the UEs in the group.

In a further alternative embodiment, the method to control connectivity includes controlling modification of an existing group bearer and/or PDU session that has been established between the radio access network node and the application server that is executing the application for use in carrying communications between the UEs and the application, responsive to the characteristics of the UEs in the group.

In some further alternative embodiments, the method to control connectivity includes controlling modification and/or release of an existing group bearer and/or PDU session that has been established between the radio access network node and the application server that is executing the application for use in carrying communications between the UEs and the application, responsive to the characteristics of the UEs in the group.

Another related embodiment is directed to a method by an application server of a communications system. The method includes identifying a group of UEs that will communicate with an application being executed by the application server which controls parameters used by the group of UEs for operation in a vehicle platoon. For each of the UEs in the group, the method identifies a characteristic related to a functional operation of the UE with respect to the application. The method then communicates a message identifying the group of UEs and the characteristics related to the function operations of the UE, to a network node for controlling connectivity for individual ones of the UEs in the group with a radio access network node responsive to the characteristics of the other UEs in the group.

Another related embodiment is directed to a network node of a communications system, which includes a network interface, a processor, and a memory. The network interface is configured to communicate with UEs via a Radio Access Network (RAN) and with an application server. The processor is coupled to the network interface. The memory includes program code that is executed by the processor to perform operations. The operations include identifying a group of UEs that will communicate with an application being executed by the application server which controls parameters used by the group of UEs for operation in a vehicle platoon, and controlling connectivity for one of the UEs in the group with a radio access network node responsive to characteristics of the other UEs in the group. For each of the UEs the characteristic relates to a functional operation of the UE with respect to the application.

Another related embodiment is directed to an application server of a communications system, which includes a network interface, a processor, and a memory. The network interface is configured to communicate with a network node via a network. The processor is coupled to the network interface. The memory includes program code that is executed by the processor to perform operations. The operations include identifying a group of UEs that will communicate with an application being executed by the application server which controls parameters used by the group of UEs for operation in a vehicle platoon. For each of the UEs in the group, the operations identify a characteristic related to a functional operation of the UE with respect to the application. The operations communicate a message identifying the group of UEs and the characteristics related to the function operations of the UE, to a network node for controlling connectivity for individual ones of the UEs in the group with a radio access network node responsive to the characteristics of the other UEs in the group.

Other methods by network nodes, methods by application servers, network nodes, and application servers according to embodiments will be or become apparent to one with skill in the art upon review of the following drawings and detailed description. It is intended that all such additional methods, network nodes, and application servers be included within this description and protected by the accompanying claims.

BRIEF DESCRIPTION OF THE DRAWINGS

Aspects of the present disclosure are illustrated by way of example and are not limited by the accompanying drawings. In the drawings.

DETAILED DESCRIPTION

Figure 1:
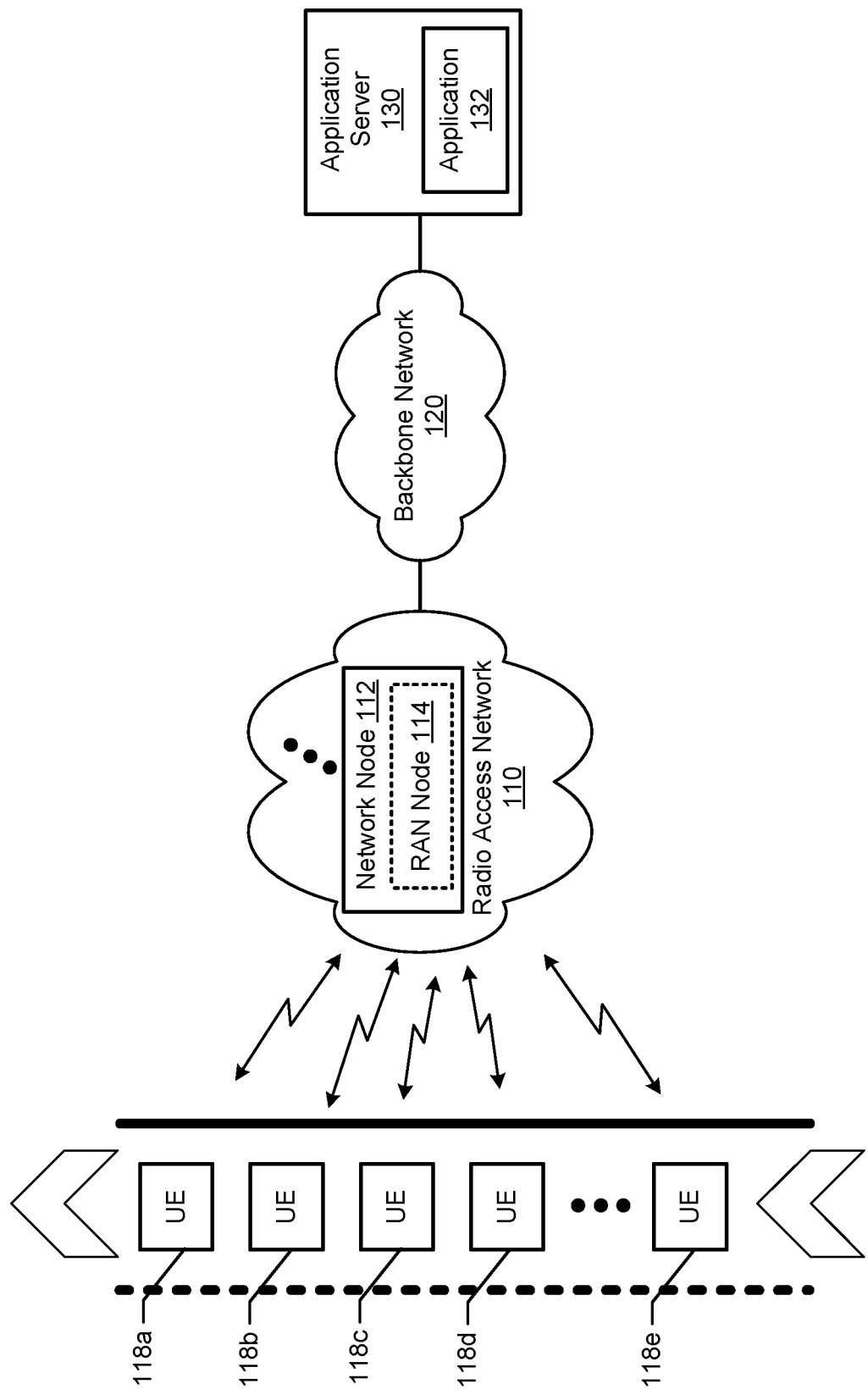
FIG. 1 illustrates a communications system having an application server and a network node that are configured to operate according to various embodiments of the present disclosure to control connectivity to UEs.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment. Any two or more embodiments described below may be combined in any way with each other.

In communication systems there can be many types of applications that operate to remotely control a group of UEs or share operational information between the UEs in the group (sometimes bidirectionally), and which may need to have simultaneous connectivity to all UEs in the group (also referred to as "grouped UEs" for brevity). Examples applications for vehicular environments include fleet management, vehicle trajectory sharing, vehicle cruise control, and which have substantially different operations in requirements from group-oriented services that are supported by network nodes of cellular communications systems. A particular example is platooning, where multiple vehicles sharing the same journey are grouped together with the same driving behavior (speed, trajectory, etc.) and the application that is managing the platoon controls parameters such as the inter-vehicle distance (spacing between vehicles) and platoon speed. Therefore, certain information needs to be gathered from platoon members to allow the application to operationally determine the current status of platoon members, and enable the application to make decisions and communicate information to the platoon vehicles that controls platoon behavior (e.g., speed of the platoon vehicles, inter-vehicle distance, etc.). The radio communication node within each of the vehicles is a non-limiting example type of UE. Thus, from a communications operational viewpoint in the context of attending of vehicles, vehicles within a platoon can be also be more generally referred to as a group of UEs.

In above listed solutions, even if a network node is aware that some UEs are grouped for some particular aspects (i.e., data reception, paging, handover), the network node still performs procedures such as admission control, bearer/PDU-session establishment/modification, QoS handling on a per-UE basis without consideration of how that same procedure is being performed or will be performed for other UEs that are in that same group. In view of the operational needs for providing platooning as explained above, operational issues occurring with the connectivity of one of the UEs (within one of the vehicles) of the platoon may result in serious operational issues when attempting to manage other UEs of the platoon. With existing solutions where the connectivity is managed on a per-UE basis, the network node is not aware that a certain group of UEs belongs to the same platoon (or other functional grouping). Consequently, whenever the network takes a decision for a UE (e.g., bearer or PDU-session rejection or QoS modification), if the UE belongs to a platoon such decision might create instability within the platoon with potential negative effects such as interrupting the communications among platoon members or removing UEs from the platoon. Additionally, in case one or more of the UEs in the platoon need to be rejected by admission control procedures, the eNB or other network node does not have an operational tool to distinguish the UEs in the platoon from other UEs and could reject any UE thereby affecting the stability of the platoon itself.

Various embodiments of the present disclosure are directed to operations by a network node and application server that can allow a mobile communications system to be aware that multiple UEs are grouped together from connectivity management purposes, because the UEs will communicate with a same application being executed by the application server. The connectivity for each UE is managed independently, however the network node makes management decisions with consideration that each modification done to the connectivity of any UE belonging to a group might operationally impact the application the UEs of the group are functionally operating in concert with. Additional parameters might be associated to each UE belonging to the group, allowing the network node to implement a different treatment for the UEs associated to the same application, if needed, while still keeping the information that the modification done has reflections on the status of the group.

Potential advantages that can be provided by one or more of the embodiments disclosed herein can include, allowing the network node to take decisions about UE connectivity with increased awareness considering the potential impact that a connectivity management decision for one UE and a group can have on operation of other UEs in the group, where the UEs in the group are associated to the same service provided by an application which controls parameters used by the group of UEs for operation in a vehicle platoon. The network node may thereby make better operational decisions, e.g., in case of radio congestion the eNB or other network node is aware of whether dropping a certain UE will impact the service of other UEs in the same group, i.e. associated to the same service provided by the application. An advantage that may be provided to the application providing the service to the group of UEs is that there is a reduced probability that in case of radio congestion a UE involved in the service will be dropped. For example, the eNB or other network node can decide to drop another UE that is not part of the group involved in the service and thereby avoid a negative operational consequence to the UEs in the group.

FIG. 1 illustrates a communications system having an application server 130 and a network node 112 that are configured to operate according to various embodiments of the present disclosure to control connectivity to UEs.

Referring to FIG. 1, the communications system includes a group of UEs 118a-e (also referred to as 118) that are each located in a platoon of vehicles which are illustrated as traveling in a same direction along a lane of a road and with a controlled spacing therebetween. The UEs 118 communicate with an application 132 being executed by the application server 130. The application 132 can provide various services for the vehicles, such as described below. Communications between the UEs 118 and the application 132 are carried through a radio access network 110 and backbone network 120. The radio access network 110 can include a plurality of network nodes 112, such may include radio access network (RAN) nodes 114 such as eNBs, radio transceiver base stations, remote radio heads, etc. although the application 132 is illustrated as being executed by the application server 130, it may additionally or alternatively be executed by one or more of the UEs 118, such as will be described in further detail below.

The UE herein can be any type of wireless device capable of communicating with a network node or another UE over radio signals. The UE may also be a radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE), etc.

Also in some embodiments generic terminology, "radio network node" (RAN) or simply "network node (NW node)", is used and can be any kind of node which may comprise of base station, radio base station, base transceiver station, base station controller, network controller, evolved Node B (eNB), Node B, Multi-cell/multicast Coordination Entity (MCE), relay node, access point, radio access point, Remote Radio Unit (RRU) Remote Radio Head (RRH), a core network node (e.g., TCE, MME, MDT node, MBMS node), or even an external node (e.g., 3rd party node, a node external to the current network), etc.

Example operations are now explained by way of non-limited examples scenarios made with reference to FIG. 1. When a service provided by the application 132 needs to exchange data simultaneously with all UEs involved in the service, the system operates to provide a communication infrastructure between the application server 130 and the involved UEs 118, including radio links between the UEs 118 and the RAN node 114 and sidelink (ad-hoc) communications directly between the UEs 118. An example service by the application 132 can include management of multiple vehicles, e.g., platooning, where involved vehicles are grouped together sharing the same driving behavior (speed, direction, trajectory, etc.) and the service needs to gather some information from involved vehicles (location, speed, etc.) and distribute some information (platoon speed, platoon trajectory, inter-vehicle distance, etc.) among involved vehicles. Another example service can include managing a lane merge, where in this case the service needs to gather some information (location, speed, trajectory, etc.) from vehicles approaching the location of the lane merge and distribute some information (suggested speed, suggested trajectory, etc.) to involved vehicles. UEs 118 within each of the vehicles perform the radio communications with the radio access network 110 and sidelink (ad-hoc) communications directly between the UEs 118 in different vehicles.

Although various embodiments are described in the context of vehicular communications, these and other embodiments disclosed herein can be applicable to any type of group service or task, e.g. UEs operating with the same type of services/tasks within a Mission-Critical Push to Talk (MCPTT) group or MBMS service, or UEs moving together within a bus, train, truck, car, etc, or which are being transported by a group of individuals were walking or cycling together. Also note that the UEs that are logically associated in a group may be known by lower layer nodes (i.e. RAN nodes 114) or only the application server 130, e.g., a V2X application server, may be aware of which UEs are associated with a defined group.

According to a first embodiment, upper layers, e.g. V2X application server, provides the network node 112 with a list of UEs 118 that are involved in operation a certain service, e.g. a V2X service, provided by the application 132. Considering more complex services, the upped layers may form multiple groups of UEs, where each of the groups of UEs may be associated with operating with the same V2X service but where each group consists of UEs having similar features within that group, such as UEs located in the same geographical area, UEs moving in the same direction, or UEs associated with performing the same task, etc. In one example, the application 132 notifies the network node 112 of a list of which UEs are in a group before the delivery of the service (i.e., before or during the service establishment) and the application 132 may provide further notifications to the network node 112 that update the list of which UEs are in the group during ongoing delivery of the service. The list of UEs is intended to be used by the network node 112 to identify which UEs are in a group by their being are logically associated to the same application (or same networking context, such as all UEs inside a vehicle) while each of these UEs still require a separate connectivity management towards one or more UEs belonging to the list or towards one or more external applications (e.g. the group of UEs in the same vehicular bus will run different applications or will send/receive different information to/from the same application). Information defining the list of UEs involved in the service, i.e., that will communicate with the application 132 providing the service, provides an additional capability for the network node 112 to be able to determine that a modification of the connectivity for any of the UEs present in the list might have an impact on the overall service behavior.

In addition to the list of UEs, the service might also indicate the QoS demand associated to a certain group of UEs which will be operating as part of a defined service. Different group of UEs operating for the same service may have different QoS characteristics depending on, for example, on the subscription profiles of the individual UEs. Additionally, UEs belonging to the same group may be associated by network configuration to different QoS profiles, e.g. depending on the relative position of the UE within the group relative to other UEs (e.g., location of the UE within a defined ordered sequence of the UEs in the group), the speed at which different UEs are travelling, the role of the UEs within the group. Thus, characteristics of all UEs within the group may be considered by the admission control procedure of the network node 112, instead of determining admission control for a particular UE without considering the characteristics of other UEs within the same group as the UE. Moreover, the group affiliation of a UE can be considered when the network node 112 is performing QoS modification, i.e. when the network node 112 or other system node (e.g., RAN node 114) changes Guaranteed Flow Bit Rate (G(F)BR) or QoS Class Identifier (QCI) of UEs in the cell, 5G QCI, relative importance of the UEs in the group may be considered.

For example, assuming a platoon of vehicles travelling together as a group and aligned along a lane, the network may assign higher priority (e.g. higher Authentication Retention Priority (ARP), or higher QCI priority) to a UE which comes first in the line (e.g. to the platoon headers or to the platoon leader), since rejecting connection establishment to the first UE might affect the whole platoon performances (or even the platoon creation). On the other hand, if data relaying over the sidelink is considered, larger Guaranteed Bit Rate (GBR) requirements may be assigned to UEs that comes after the platoon line, since such UEs may need to forward to other UEs which come thereafter in the line all (or part of) the information related to UEs that come prior in the line.

Example roles that various UEs in the group can have include, but are not limited to: 1) operational leader of UEs within the group, such as the UE residing in a lead vehicle among a platoon; 2) the location of a UE within a sequence of UEs within a group and the related responsibility of the UE to relay information from a previous located one or more UEs and the UE's own information to a next in sequence located UE; and 3) responsibility of the UE to coordinate relay of information from other UEs in the group to the application 132 and/or vice versa. For example, a UE that is located as a platoon vehicle leader, such as a first vehicle and a line of platooning vehicles, may have a functional responsibility to collect and relay thus be, spacing, route, operational status, and/or other information of other UEs in the platoon to the application 132. Similarly, the UE located in the platoon vehicle leader may be responsible for relaying control information from the application 132, such as target speed, target spacing, target route, etc., to the other UEs in the platoon.

The UEs that are grouped as being involved in a service and their related QoS demand might be exploited for different network procedures (such as one or more of admission control, bearer or PDU Session establishment, bearer or PDU Session modification, etc.) and by different network functions (such as one or more of RAN nodes, Access and Mobility Management Function (AMF), Session Management Function (SMF), Policy Control Function (PCF), etc.). The network node can use the information about the UEs, which are grouped communicating with the application to perform service, to control connectivity for individual ones of the UEs in the group. Various actions are described below that can be performed by the network node 112 to control connectivity of the UEs in a group with a radio access network node upon initial connection establishment or handover.

Figure 2:
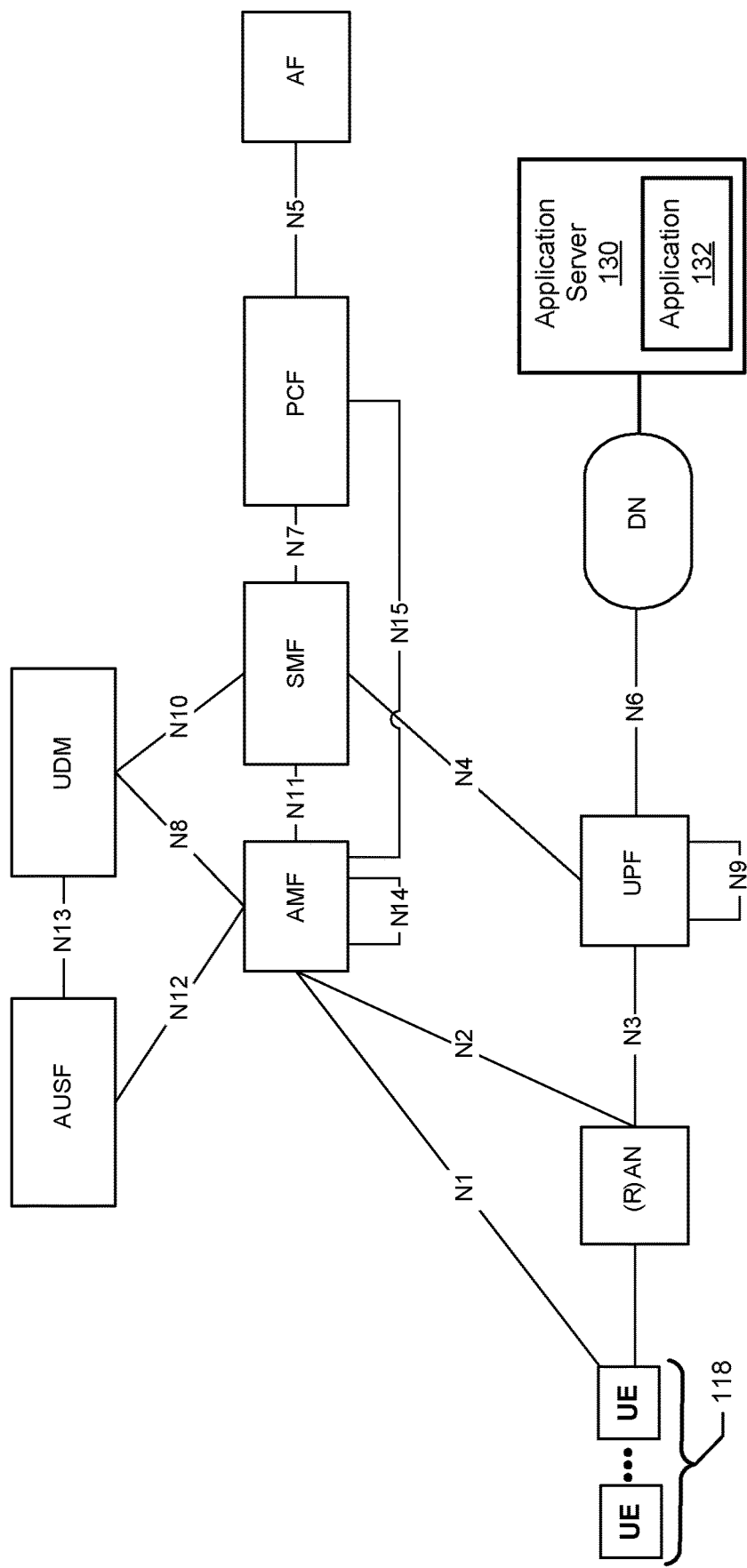
FIG. 2 illustrates example elements of the communications system of FIG. 1 which may be configured to operate according to various embodiments of the present disclosure.

FIG. 2 illustrates non-limiting example elements of the communications system of FIG. 1 which may be configured to operate according to various embodiments of the present disclosure. More particularly, FIG. 2 is a block diagram of an example 5G system architecture in reference point representation. Referring to FIG. 2, the system includes: an Authentication Server Function (AUSF) a Unified Data Management (UDM); a Core Access and Mobility Management Function (AMF); a Session Management Function (SMF); a Policy Control Function (PCF); an Application Function (AF); a User Equipment (UE); a (Radio) Access Network ((R)AN)); a User Plane Function (UPF); and a Data Network (DN), e.g. operator services, Internet or 3rd party services. The term "(Radio) Access Network" and associated acronym "(R)AN" are used interchangeably herein as having the same meaning as the corresponding terms "Radio Access Network" and associated acronym "RAN". The functional operations disclosed herein for a network node 112 may be partially or wholly incorporated into any of the elements of FIG. 2.

Figure 3:
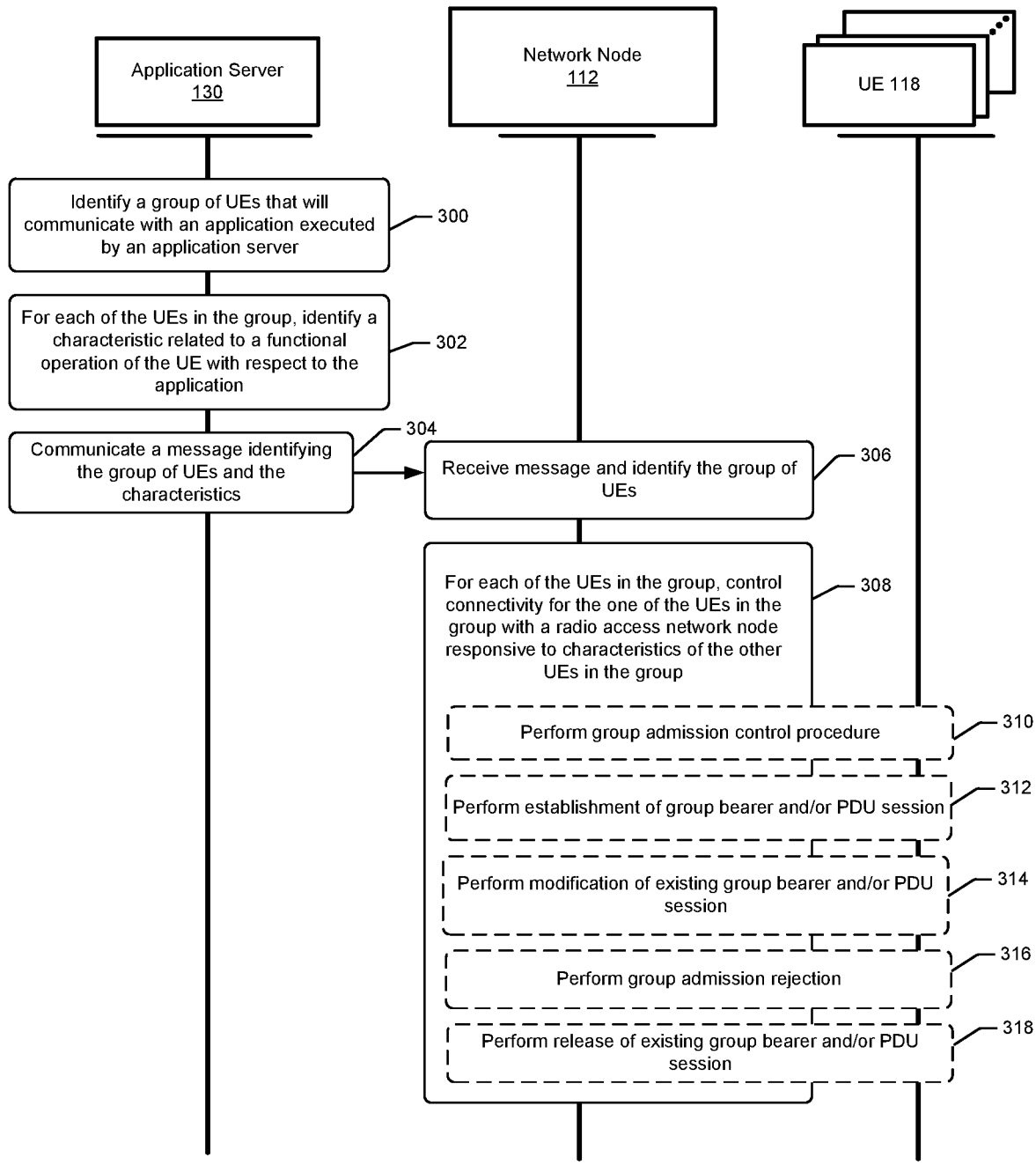
FIG. 3 illustrates a combined flowchart and dataflow diagram of operations that can be performed by the application server, the network node, and the UEs of FIG. 1 according to various embodiments of the present disclosure.

FIG. 3 illustrates a combined flowchart and dataflow diagram of operations that can be performed by the application server 130, the network node 112, and the UEs 118 of FIG. 1 according to various embodiments of the present disclosure.

Referring to FIG. 3, application server 130 identifies 300a group of UEs 118 that will communicate with the application 132 being executed by the application server 130 which controls parameters used by the group of UEs for operation in a vehicle platoon. For each of the UEs 118 in the group, application server 130 identifies 302 a characteristic related to a functional operation of the UE with respect to the application 132. The application server 130 communicates 304 a message identifying the group of UEs and the characteristics related to the function operations of the UE, to the network node 112 to control connectivity for individual ones of the UEs 118 in the group with the RAN node 114 responsive to the characteristics of the other UEs 118 in the group.

The network node identifies 306 the group of UEs 118 that will communicate with the application 132, such as based on receiving the message from the application server 130. For each of the UEs 118 in the group, the network node 112 controls 308 connectivity for the one of the UEs in the group with the RAN and 14 responsive to characteristics of the other UEs 118 in the group. For each of the UEs 118 the characteristic relates to a functional operation of the UE with respect to the application 132. As will be explained in further detail below, various operations that the network node 112 can perform to control 308 connectivity of the UEs and the group can include any one or more of: 1) performing 310 group admission control procedures for individual ones of the UEs based on the characteristics of the other UEs in the group; 2) performing 312 establishment of group bearer and/or PDU session for individual ones of the UEs based on the characteristics of the other UEs in the group; 3) performing 314 modification of existing group bearer and/or PDU session for individual ones of the UEs based on the characteristics of the other UEs in the group; 4) performing 316 group admission rejection for individual ones of the UEs or the collective group of UEs based on the characteristics of the UEs in the group; and 5) performing 318 operations to release an existing group bearer and/or PDU session for the collective group of UEs and/or individual UEs within the group.

Regarding operations to perform 310 a group admission control procedure, the network node 112 considers the characteristics of all UEs that are within a group, assuming that all UEs in the group will shortly enter the cell/area. In one example, the group admission control is performed by considering if there are available network resources for all UEs in the group, i.e. considering the QoS profiles such as QCI and/or ARP of all the UEs jointly. For example, the target eNB (or target cell) may receive as part of a single initial context setup request (or handover request) all the QoS characteristics of the UEs in the group (in which case it is assumed that the eNB is aware of which UEs are in the defined group), or as part of multiple initial context setup requests (or handover requests) for each UE in the group.

Figure 4:
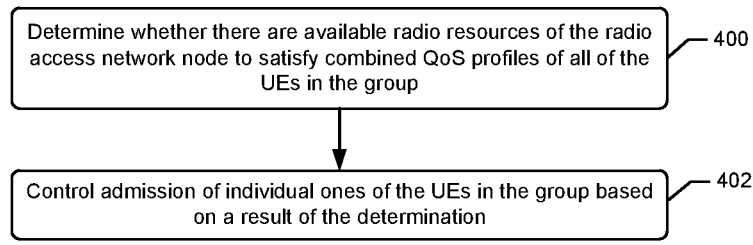
FIGS. 4-9 illustrate flowcharts of operations that can be performed by the network node of FIG. 1 according to various embodiments of the present disclosure.

In one embodiment of the operations 310, for each of the UEs in the group, the network node 112 controls 310 admission of one of the UE in the group to utilize radio resources of the RAN node 114 for communication with the application 132 responsive to the characteristics of the other UEs in the group. Referring to the example operations shown in FIG. 4, operations to control 310 admission of the UE can include determining 400 whether there are available radio resources of the RAN node 114 to satisfy combined QoS profiles of all of the UEs in the group. The operations further include controlling 402 admission of individual ones of the UEs in the group based on a result of the determination 400.

In a further embodiment thereof, the determination whether there are available radio resources of the RAN node 114 to satisfy combined QoS profiles of all of the UEs in the group, includes determining whether there are available radio resources of the radio access network node to satisfy combined requirements of QoS Class Identifiers of all of the UEs in the group, 5G QoS Class Identifiers of all of the UEs in the group, and/or of Authentication Retention Priorities of all of the UEs in the group.

Figure 5:
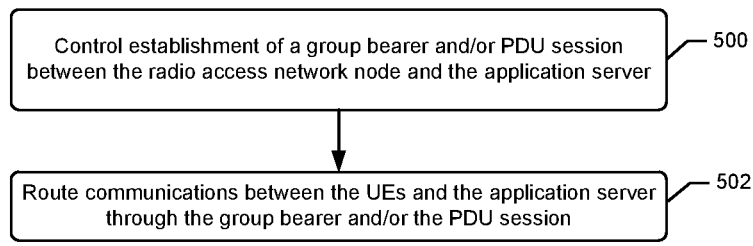

FIG. 5 illustrates example operations that can be performed by the network node 112 to perform 312 establishment of group bearer and/or PDU session for individual ones of the UEs based on the characteristics of the other UEs in the group. Referring to FIG. 5, the operations control 500 establishment of a group bearer and/or PDU session between the RAN node 114 and the application server 130 that is executing the application 132 for use in carrying communications between the UEs 118 and the application 132, responsive to the characteristics of the UEs 118 in the group. Following the establishment, the operations route 502 communications between the UEs 118 and the application server 130 through the group bearer and/or the PDU session.

In a further embodiment, operations to control 500 establishment of the group bearer and/or PDU session can include determining whether there are available network communication resources between the RAN node 114 and the application server 130 to satisfy combined profiles of all of the UEs 118 in the group. The operations selectively establish the group bearer and/or PDU session for individual ones of the UEs 118 in the group based on a result of the determination.

Accordingly, the network node 112 can perform a group bearer (group bearers are virtual bearers, logically grouping a set of unicast bearers together) or PDU Session establishment considering all UEs listed in the list. The group bearer or PDU Session establishment may be performed by considering if there are available resources to establish a bearer or a PDU Session for all UEs listed in the list as part of the E-RAB setup request or handover request.

The network node 112 may perform a group bearer or PDU Session modification considering all UEs 118 listed in the group (i.e. the network node 112 needs to modify a set of unicast bearers, which belong to UEs in that group). In one example, the group bearer or PDU Session modification is performed simultaneously for all UEs 118 in the group. In another example, the impossibility for the radio access network 110 and/or the backbone network 120 to satisfy the QoS demand of one of the UEs 118 in the group might involve a group bearer or PDU Session modification, thus involving all UEs 118 associated to the service provided by the application 132, or only those UEs 118 within the group which do not satisfy the QoS demands and/or depending on the role of the UE 118 within the group such as described above. These operations may be performed assuming that the remaining UEs 118 in the group cannot benefit from higher QoS levels, when the QoS cannot be satisfied for all UEs 118 in the group.

Figure 6:
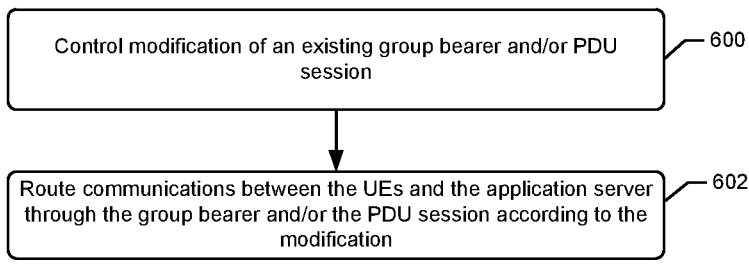

FIG. 6 illustrates example operations that can be performed by the network node 112 to modify an existing group bearer and/or PDU session for individual ones of the UEs based on the characteristics of the other UEs in the group. Referring to FIG. 6, the operations include controlling 600 modification of an existing group bearer and/or PDU session that has been established between the RAN node 114 and the application server 130 that is executing the application 132 for use in carrying communications between the UEs 118 and the application 132, responsive to the characteristics of the UEs 132 in the group. Following the modification, the operations route 602 communications between the UEs 118 and the application server 130 through the group bearer and/or the PDU session operated according to the modification.

The network node 112 may perform a group rejection considering all UEs 118 in the group (e.g. the QoS bearer request for all group members). In one example, the group rejection is performed simultaneously for all UEs 118 in the group, in which case a rejection command is triggered by the network node 112. In another example, the necessity of performing a rejection for one of the UEs 118 in the group is performed by a group rejection thus involving all UEs 118 associated to the service provided by the application 132, or only the UEs 118 which do not satisfy the QoS requirements and/or depending on the role of the UE 118 within the group, such as described above.

Figure 7:
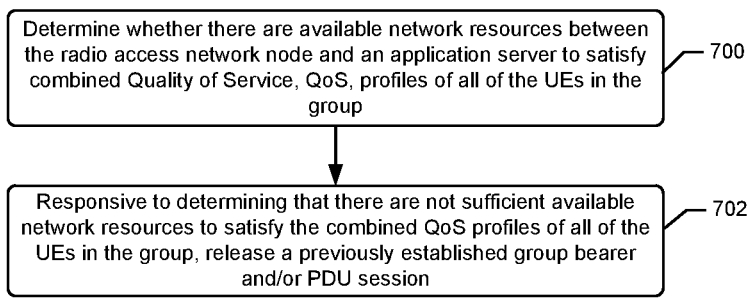

FIG. 7 illustrates example operations that can be performed by the network node 112 for group admission rejection for individual ones of the UEs 118 or the collective group of UEs 118 based on the characteristics of the UEs 118 in the group. Referring to FIG. 7, the operations determine 700 whether there are available network resources between the RAN node 114 and the application server 130, which is executing the application 132 for use in carrying communication with the UEs in the group, to satisfy combined QoS profiles of all of the UEs 118 in the group. Responsive to determining that there are not sufficient available network resources between the RAN node 114 and the application server 130 to satisfy the combined QoS profiles of all of the UEs 118 in the group, the operations release 702 a previously established group bearer and/or PDU session between the RAN node 114 and the application server 130 to prevent further carrying of communications therethrough between the UEs 118 and the application 132.

The network node 112 may perform a group bearer or PDU Session release considering all UEs 118 in the group. In one example, the unicast bearer or PDU Session release is performed simultaneously for all UEs 118 in the group. In another example, the necessity of performing a bearer or PDU Session release for one of the UEs 118 in the group might involve a bearer or PDU Session release thus involving all UEs 118 associated to the service provided by the application 132, or only the UEs 118 which do not satisfy the QoS requirements and/or depending on the role of the UE 118 within the group, such as described above.

Figure 8:
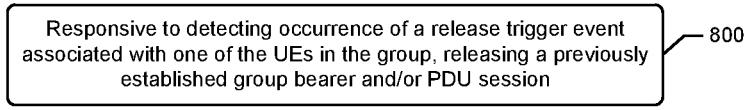

FIG. 8 illustrates example operations that can be performed by the network node 112 to release an existing group bearer and/or PDU session for the collective group of UEs 118 and/or individual UEs 118 within the group. Referring to FIG. 8, responsive to detecting occurrence of a release trigger event associated with one of the UEs 118 in the group, the operations release 800 a previously established group bearer and/or PDU session between the RAN node 114 and the application server 130, and which was used to carry communications between any of the UEs 118 in the group and the application 132, to prevent further carrying of communications therethrough between any of the UEs 118 and the application 132.

The network node 112 may perform admission control for each individual UE 118 in the group. Depending on the ARP and QCI values some UEs 118 within the group (first subgroup of UEs) may be rejected while some other UEs in the group (second subgroup of UEs) may be admitted but with no dedicated bearer established, meaning that only low data rate (e.g. non-GBR) and QoS performances can be performed for communications with those other UEs in the group (the second subgroup of UEs). Corresponding operations that can be performed by the network node 112 to control 308 connectivity can include making an individual decision for controlling the admission of and the QoS granted to the UE to utilize radio resources of the RAN node 114 for communication with the application 132 responsive to the characteristics of the other UEs 118 in the group.

Various operations will not be described that can be performed to cause the network node 112 to identify how to handle the connectivity (admission control, bearer or PDU session establishment, bearer or PDU session modification, bearer or PDU session release, UP deactivation, etc.) for each UE 118 in the group of UEs associated to the service provided by the application 132. The network node 112 may be configured to perform any one or more of these operations, and the functions of any two or more of the operations may be combined or performed separately.

Upper layers (e.g., performed by a V2X application executed by the application server 130 or performed by a V2X application executed by one or more of the UEs) provides the network node 112 with information about the priority of the UEs 118 in the group. The association of a UE 118 to a priority might be related to, for instance, different roles of the UEs 118 within the service provided by the V2X or other application. In one example considering a platooning service, the service associates the highest priority to the UE 118a (FIG. 1) transported by the platoon leader, while considering that the other UEs 118b-118e (FIG. 1) of other platoon members have the same priority that is lower than the UE 118a of the platoon leader.

In another example considering platooning, the service associates the priority according to the position within an ordered sequence of the vehicles which are transporting the UEs 118a-118e within the platoon, i.e., decreasing priority from the head (first position) of the platoon (highest priority to the platoon leader, e.g., UE 118a) to the tail (last position), e.g., UE 118e.

In a further example in the context of platooning, the service assigns the priorities to UEs according to the tasks assigned to the vehicles, e.g., higher priorities are assigned to UEs that are involved in video sharing tasks while lower priorities are assigned to UEs that are not involved in video sharing. From a signaling perspective, upper layers may indicate to eNBs the priority of each UE within the group, for example by signaling higher ARP values (i.e. lower absolute priority) or lower QCI priority for UEs with lower priority within the group, where such priority is proportional to the UE position/role within the platoon. Rather than QCI and ARP, another priority tag for group members may be used. One possible network implementation can be for UEs with higher priority both control plane and user plane connection can be guaranteed with certain QoS characteristics, while for UEs with lower priority only control plane connection and limited user plane performances are allowed.

Corresponding operations that may be performed by the network node 112 to control 308 connectivity for one of the UEs 118 in the group, can include, for each of the UEs 118 in the group, controlling admission of and QoS granted to the UE 118 to utilize radio resources of the RAN node 114 for communication with the application responsive to the characteristics of the other UEs 118 in the group.

Figure 9:
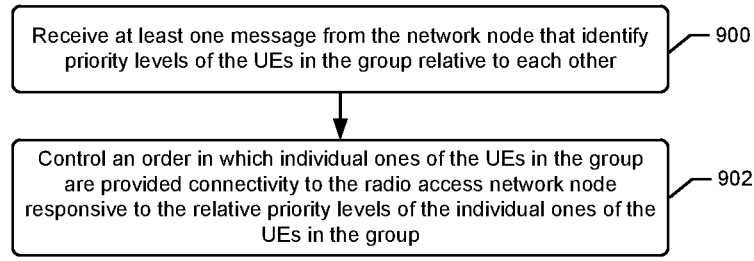

FIG. 9 illustrates other corresponding operations that may be performed by a network node 118 control 308 connectivity for one of the UEs 118 in the group can include, the operations that may be performed by the network node 112 to control 308 connectivity for one of the UEs 118 in the group. Referring to FIG. 9, the operations receive 900 at least one message from the network node 112 that identify priority levels of the UEs 118 in the group relative to each other. The operations to control 308 connectivity for one of the UEs 118 in the group with the RAN node 114 responsive to characteristics of the other UEs 118 in the group, include controlling 902 an order in which individual ones of the UEs 118 in the group are provided connectivity to the RAN node 114 responsive to the relative priority levels of the individual ones of the UEs 118 in the group.

The network node 112 may operate to use the priorities provided by the upper layers for the network procedures related to the UEs 118 associated to the service. In one example, the network node 112 uses the priorities for admission control purposes, processing the admission control task from the UE 118 with a higher priority before processing the admission control task from the UE 118 with a lower priority in order to avoid that UEs 118 with a lower priority will be admitted before UEs 118 with a higher priority (or that UEs 118 with higher priority will not be admitted). In another example, the network node 112 uses the defined priorities if QoS modification is needed in case of access congestion. In this example, the network node 112 starts to modify the QoS from the UEs 118 with the lowest or lower priority with the operational goal to try to avoid a QoS modification for UEs 118 with highest or higher priority.

The upper layers may provide the network node 112 with different priorities levels for different procedures of the service provided by the application 132. In one example, all UEs 118 in the group might have the same priority for admission control (meaning that the network node 112 should try to admit all UEs 118 simultaneously), while the UEs might be defined to have differing priorities for QoS modification.

As explained above in the context of FIG. 3, the application server 130 can identify 300 a group of UEs 118 that will communicate with the application and 32 being executed by the application server 130. For each of the UEs 118 in the group, application server 130 identifies 302 a characteristic related to a functional operation of the UE 118 with respect to the application 132, and communicates 304 to the network node 112 a message identifying the group of UEs 118 and the characteristics related to the function operations of the UE, to control connectivity for individual ones of the UEs 118 in the group with the RAN node 114 responsive to the characteristics of the other UEs 118 in the group. In a further embodiment of the operations described above in which the network node 112 controls connectivity based on priorities between the UEs 118 in the group, the characteristics that are identified by the message indicate a first set of priority levels of the UEs 118 in the group relative to each other that are to be used by the network node 112 to individually control an order in which individual ones of the UEs 118 in the group are provided connectivity to the RAN node 114 to the UEs 118 in the group. The message further indicates a second set of priority levels of the UEs in the group relative to each other that are to be used by the network node 112 to individually control QoS levels granted and/or modified for the UEs in the group. The network node 112 responsively controls connectivity of individual UEs in the group based on their relative priorities.

The upper layers and the network node 112 may operate to negotiate which network procedures supports UE priority. The priority of UEs 118 may be changed by the service provided by the application 132 to adapt the behavior of a particular individual UE or the collective group of UEs 118 during the service delivery. The service provided by the application 132 and the network node 112 may negotiate which network procedures support dynamic change of UE priority. The upper layers may provide the network node 112 with information about the QoS profile of each UE 118 in the group.

In a further embodiment when the network node 112 has rejected connectivity of a sub-group of the UEs 118 in the group, a new group of UEs may be created from that sub-group. For example, a new group identifier B for a specific V2X service is allocated by the V2X application server, with a modified QoS characteristic. In a further example, upon being rejected all UEs that were rejected may initiate a new connection establishment procedure and become associated to a new group identity. When the application server 130 is configured to be aware of the geographic location of the different platoons (groups of UEs) within the communication system, the application server 130 may operate to form a larger platoon in response to different platoons becoming sufficiently geographically close to each other to trigger operations by the application server 130 that attempt to reestablish the platoon A and B is a combined platoon for connectivity management purposes.

Figure 10:
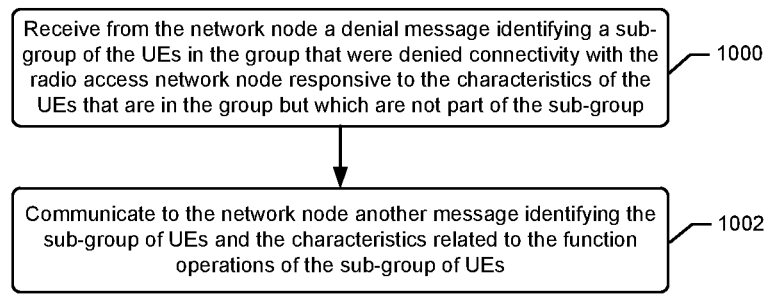
FIG. 10 illustrates a flowchart of operations that can be performed by the application server of FIG. 1 according to various embodiments of the present disclosure.

FIG. 10 illustrates corresponding operations that may be performed by the application server 130 accordance with one embodiment. Referring to FIG. 10, the application server 130 (e.g., application 132 executed by the application server 130) receives 1000 from the network node 112 a denial message identifying a sub-group of the UEs 118 in the group that were denied connectivity with the RAN node 114 responsive to the characteristics of the UEs 118 that are in the group but which are not part of the sub-group. The UEs in the group that are not part of the sub-group have been provided connectivity with the RAN node 114. Application server 130 responsively communicates 1002 another message identifying the sub-group of UEs 118 and the characteristics related to the function operations of the sub-group of UEs 118, to the network node 112 for controlling connectivity for individual ones of the UEs 118 in the sub-group with the RAN node 114 responsive to the characteristics of the other UEs 118 in the sub-group.

In some other embodiments, there can be different realizations for a group bearer (or, similarly, for a group PDU Session). One realization would be a new bearer type, where the UE includes a group affiliation information into the bearer establishment procedure. The network node 112 can then, based on the new affiliation ID, identify all unicast bearers, belonging to the same group. Another realization can be to create virtual groups. Here, the unicast bearer procedures are un-changed. The network node 112 gets a list of UEs of the same (virtual) group via the exposure function from either the application server 130 or by a UE application 132 performed by one of the UEs 118 (e.g. by a UE of the platoon leader). In case of bearer modification of a single group member, the network 112 applies the according changes to the unicast bearers of remaining members as well.

Example Network Node, Application Server, and User Equipment

Figure 11:
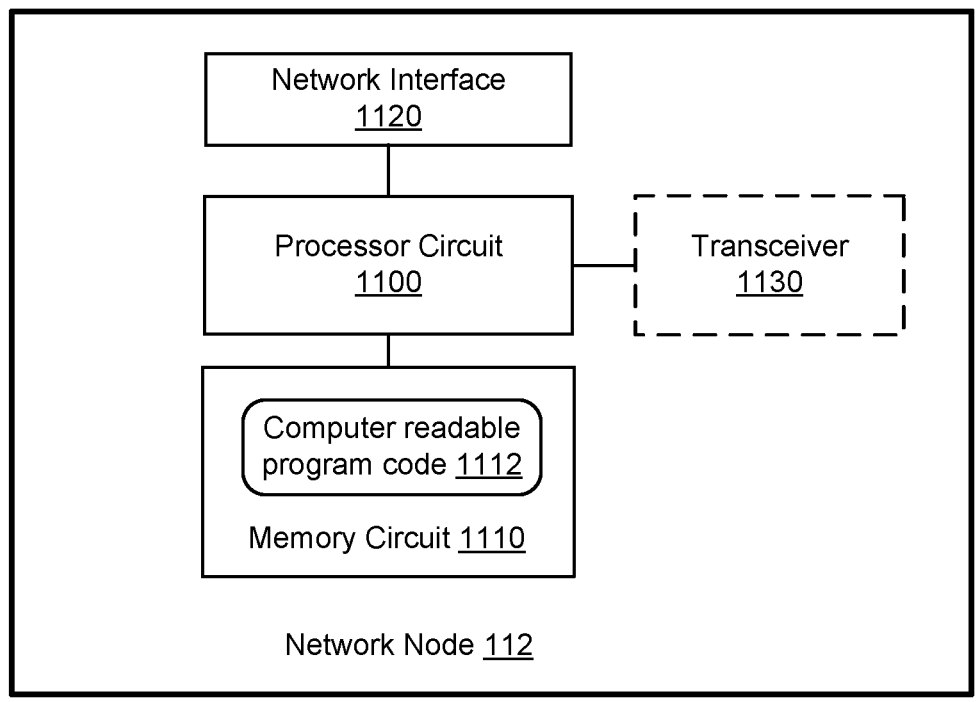
FIG. 11 illustrates a block diagram of a network node which may be used in the communications system of FIG. 1 and configured to operate according to various embodiments of the present disclosure.

FIG. 11 illustrates a block diagram of a network node 112 which may be used in the communications system of FIG. 1 and configured to operate according to various embodiments of the present disclosure. The network node 112 can include at least one network interface 1120 ("network interface"), at least one processor circuit 1100 ("processor"), and at least one memory circuit 1110 ("memory") containing computer readable program code 1112. The network interface 1120 is configured to communicate with elements of the system of FIG. 1. The processor 1100 may include one or more data processing circuits, such as a general purpose and/or special purpose processor, e.g., microprocessor and/or digital signal processor, that may be collocated or distributed across one or more networks. The processor 1100 is configured to execute the computer readable program code 1112 in the memory 1110 to perform at least some of the operations and methods of described herein as being performed by a network node.

Figure 12:
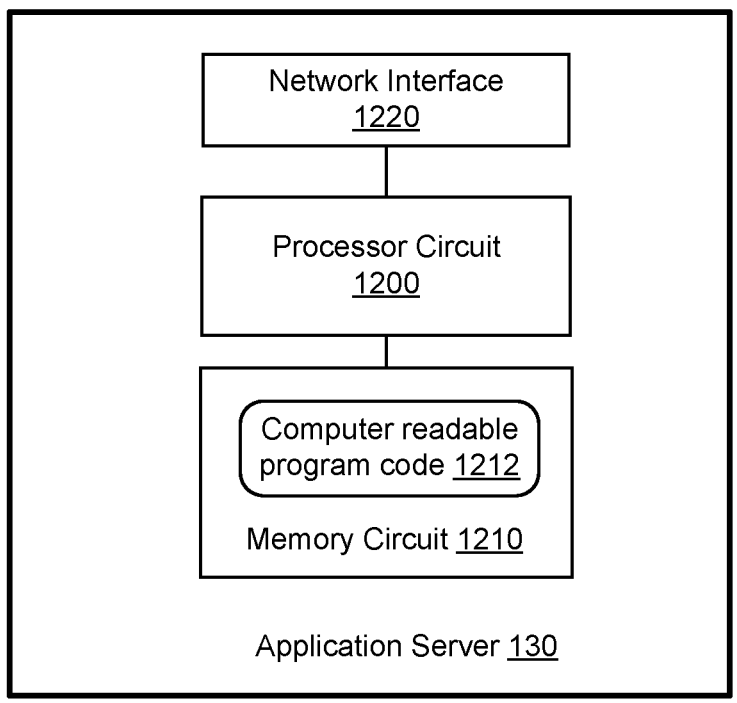
FIG. 12 illustrates a block diagram of an application server which may be used in the communications system of FIG. 1 and configured to operate according to various embodiments of the present disclosure.

FIG. 12 illustrates a block diagram of an application server 130 which may be used in the communications system of FIG. 1 and configured to operate according to various embodiments of the present disclosure. The application server 130 can include at least one network interface 1220 ("network interface"), at least one processor circuit 1200 ("processor"), and at least one memory circuit 1210 ("memory") containing computer readable program code 1212. The network interface 1220 is configured to communicate with elements of the system of FIG. 1. The processor 1200 may include one or more data processing circuits, such as a general purpose and/or special purpose processor, e.g., microprocessor and/or digital signal processor, that may be collocated or distributed across one or more networks. The processor 1200 is configured to execute the computer readable program code 1212 in the memory 1210 to perform at least some of the operations and methods of described herein as being performed by an application server.

Figure 13:
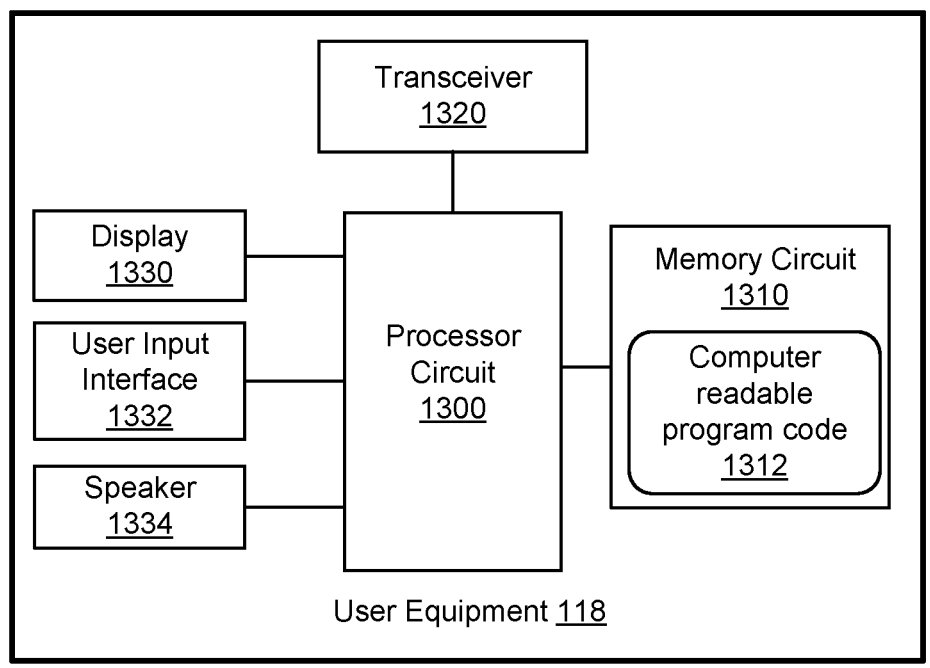
FIG. 13 illustrates a block diagram of a user equipment which may be used in the communications system of FIG. 1 and configured to operate according to various embodiments of the present disclosure.

FIG. 13 illustrates a block diagram of a user equipment 118 which may be used in the communications system of FIG. 1 and configured to operate according to various embodiments of the present disclosure. The UE 118 includes at least one transceiver 1320 ("transceiver"), at least one processor circuit 1300 ("processor"), and at least one memory circuit 1310 ("memory") containing computer readable program code 1312. The UE in 18 may further include a display 1330, a user input interface 1332, and a speaker 1334. The transceiver 1320 is configured to communicate with RANs and may communicate with other UEs, through a wireless air interface using one or more of the radio access technologies disclosed herein. The processor 1300 may include one or more data processing circuits, such as a general purpose and/or special purpose processor, e.g., microprocessor and/or digital signal processor. The processor 1300 is configured to execute the computer readable program code 1312 in the memory circuit 1310 to perform at least some of the operations described herein as being performed by a UE.

Figure 14:
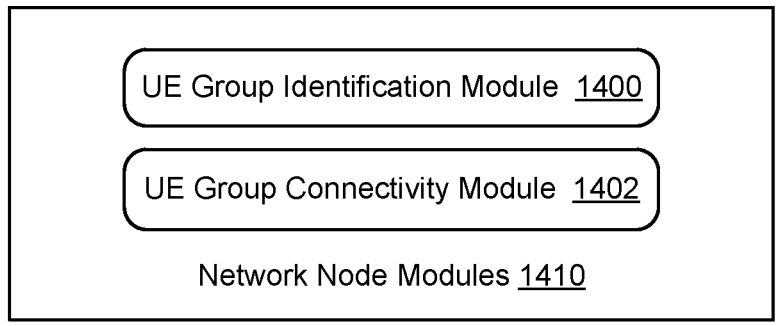
FIG. 14 illustrates modules residing in a network node that perform operations as disclosed herein according to some embodiments.

FIG. 14 illustrates modules 1410 residing in a network node that perform operations as disclosed herein according to some embodiments. The modules 1410 include a UE group identification module 1400 that functions to identify a group of UEs that will communicate with an application being executed by an application server, such as described above for operation 306 in FIGS. 3 to 9. The modules 1410 further include a UE group connectivity module 1402 that functions to control connectivity for one of the UEs in the group with a radio access network node responsive to characteristics of the other UEs in the group, wherein for each of the UEs the characteristic relates to a functional operation of the UE with respect to the application, such as described above for operation 308 in FIGS. 3 to 9.

Figure 15:
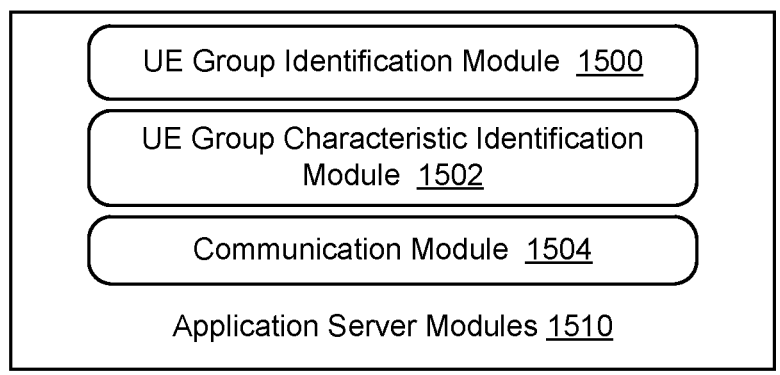
FIG. 15 illustrates modules residing in an application server that perform operations as disclosed herein according to some embodiments.

FIG. 15 illustrates modules 1510 residing in an application server that perform operations as disclosed herein according to some embodiments. The modules 1510 include a UE group identification module 1500 that functions to identify a group of UEs that will communicate with an application being executed by the application server, such as described above for operation 300 in FIGS. 3 to 10. The modules 1510 further include a UE group characteristic identification module 1502 that functions to, for each of the UEs in the group, identify a characteristic related to a functional operation of the UE with respect to the application, such as described above for operation 302. The modules 1510 further include a communication module 1504 the functions to communicate a message identifying the group of UEs and the characteristics related to the function operations of the UE, to a network node for controlling connectivity for individual ones of the UEs in the group with a radio access network node responsive to the characteristics of the other UEs in the group, such as described above for operation 304.

Abbreviations

The following abbreviations are herewith defined, at least some of which are referred to within the following description of the present invention.

| Abbreviation | Meaning |
| --- | --- |
| AMF | Access and Mobility Management Function |
| ARP | Authentication Retention Priority |
| CCE | Control Channel Element |
| DRB | Data Radio Bearer |
| eNB | Evolved NodeB |
| GBR | Guaranteed Bit Rate |
| GFBR | Guaranteed Flow Bit Rate |
| MBMS | Multimedia Broadcast/Multicast Service |
| MCPTT | Mission Critical Push To Talk |
| PCF | Policy Control Function |
| PDU | Packet Data Unit |
| PRB | Physical Resource Block |
| PUCCH | Physical Uplink Control Channel |
| QCI | QoS Class Identifier |
| QoS | Quality of Service |
| RAN | Radio Access Network |
| SMF | Session Management Function |
| SRB | Signalling Radio Bearer |
| UE | User Equipment |
| V2X | Vehicle-to-Everything |

FURTHER DEFINITIONS AND EMBODIMENTS

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-eRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

The invention claimed is:

1. A method by a network node of a communications system for controlling connectivity of user equipments (UE) that operate within a vehicle platoon, the method comprising:
identifying a group of UEs that communicates with an application being executed by an application server which controls parameters used by the group of UEs for operation in the vehicle platoon; and
controlling connectivity for one of the UEs in the group with a radio access network node responsive to characteristics of the other UEs in the group, wherein for each of the UEs the characteristic relates to a functional operation of the UE with respect to the application, wherein controlling connectivity for the one of the UEs in the group comprises:
responsive to detecting occurrence of a release trigger event associated with one of the UEs in the group, releasing a previously established group bearer and/or PDU session between the radio access network node and the application server, and which was used to carry communications between any of the UEs in the group and the application, to prevent further carrying of communications therethrough between any of the UEs and the application.

2. The method of claim 1, wherein controlling connectivity for the one of the UEs in the group comprises:
for each of the UEs in the group, controlling admission of the UE to utilize radio resources of the radio access network node for communication with the application responsive to the characteristics of the other UEs in the group.

3. The method of claim 2, wherein controlling admission of the UE to utilize radio resources of the radio access network node for communication with the application responsive to the characteristics of the other UEs in the group, comprises:
determining whether there are available radio resources of the radio access network node to satisfy combined Quality of Service (QoS) profiles of all of the UEs in the group; and
controlling admission of individual ones of the UEs in the group based on a result of the determination.

4. The method of claim 3, wherein determining whether there are available radio resources of the radio access network node to satisfy combined QoS profiles of all of the UEs in the group, comprises:
determining whether there are available radio resources of the radio access network node to satisfy combined requirements of QoS Class Identifiers of all of the UEs in the group, 5G QoS Class Identifiers of all of the UEs in the group, and/or Authentication Retention Priorities of all of the UEs in the group.

5. The method of claim 1, wherein controlling connectivity for the one of the UEs in the group comprises:
controlling establishment of a group bearer and/or PDU session between the radio access network node and the application server that is executing the application for use in carrying communications between the UEs and the application, responsive to the characteristics of the UEs in the group; and
following the establishment, routing communications between the UEs and the application server through the group bearer and/or the PDU session.

6. The method of claim 5, wherein controlling establishment of the group bearer and/or PDU session between the radio access network node and the application server responsive to the characteristics of the UEs in the group, comprises:
determining whether there are available network communication resources between the radio access network node and the application server to satisfy combined Quality of Service (QoS) profiles of all of the UEs in the group; and
selectively establishing the group bearer and/or PDU session for individual ones of the UEs in the group based on a result of the determination.

7. The method of claim 1, wherein controlling connectivity for the one of the UEs in the group comprises:
controlling modification of an existing group bearer and/or PDU session that has been established between the radio access network node and the application server that is executing the application for use in carrying communications between the UEs and the application, responsive to the characteristics of the UEs in the group; and
following the modification, routing communications between the UEs and the application server through the group bearer and/or the PDU session operated according to the modification.

8. The method of claim 1, wherein controlling connectivity for the one of the UEs in the group comprises:
determining whether there are available network resources between the radio access network node and the application server, which is executing the application for use in carrying communication with the UEs in the group, to satisfy combined Quality of Service (QoS) profiles of all of the UEs in the group; and
responsive to determining that there are not sufficient available network resources between the radio access network node and the application server to satisfy the combined QoS profiles of all of the UEs in the group, releasing a previously established group bearer and/or PDU session between the radio access network node and the application server to prevent further carrying of communications therethrough between the UEs and the application.

9. The method of claim 1, wherein controlling connectivity for the one of the UEs in the group comprises:
for each of the UEs in the group, making an individual decision for controlling the admission of and the Quality of Service (QoS), granted to the UE to utilize radio resources of the radio access network node for communication with the application responsive to the characteristics of the other UEs in the group.

10. The method of claim 1, wherein controlling connectivity for the one of the UEs in the group comprises:
for each of the UEs in the group, controlling admission of and Quality of Service (QoS) granted to the UE to utilize radio resources of the radio access network node for communication with the application responsive to the characteristics of the other UEs in the group.

11. The method of claim 1, further comprising receiving at least one message from the network node that identify priority levels of the UEs in the group relative to each other, wherein controlling connectivity for one of the UEs in the group with the radio access network node responsive to characteristics of the other UEs in the group comprises controlling an order in which individual ones of the UEs in the group are provided connectivity to the radio access network node responsive to the relative priority levels of the individual ones of the UEs in the group.

12. A computer program product comprising a non-transitory computer readable medium storing program code that when executed by a processor of a network node causes the network node to perform operations of the method of claim 1.

13. A method by an application server of a communications system, the method comprising:
identifying a group of user equipments (UEs) that communicates with an application being executed by the application server which controls parameters used by the group of UEs for operation in a vehicle platoon;
for each of the UEs in the group, identifying a characteristic related to a functional operation of the UE with respect to the application; and
communicating a message identifying the group of UEs and the characteristics related to the function operations of the UE, to a network node for controlling connectivity for individual ones of the UEs in the group with a radio access network node responsive to the characteristics of the other UEs in the group, wherein the characteristics that are identified by the message indicate a first set of priority levels of the UEs in the group relative to each other that are to be used by the network node to individually control an order in which individual ones of the UEs in the group are provided connectivity to the radio access network node to the UEs in the group, and the message further indicates a second set of priority levels of the UEs in the group relative to each other that are to be used by the network node to individually control QoS levels granted and/or modified for the UEs in the group.

14. The method of claim 13, wherein the characteristics that are identified by the message indicate priority levels of the UEs in the group relative to each other.

15. The method of claim 13, further comprising:
receiving from the network node a denial message identifying a sub-group of the UEs in the group that were denied connectivity with the radio access network node responsive to the characteristics of the UEs that are in the group but which are not part of the sub-group, wherein the UEs in the group that are not part of the subgroup are provided connectivity with the radio access network node;
communicating another message identifying the sub-group of UEs and the characteristics related to the function operations of the sub-group of UEs, to the network node for controlling connectivity for individual ones of the UEs in the subgroup with the radio access network node responsive to the characteristics of the other UEs in the sub-group.

16. A computer program product comprising a non-transitory computer readable medium storing program code that when executed by a processor of an application server causes the application server to perform operations of the method of claim 13.

17. A network node of a communications system, the network node comprising:
a network interface configured to communicate with UEs via a Radio Access Network (RAN) and with the application server;
a processor coupled to the network interface; and
a memory comprising program code that is executed by the processor to perform operations comprising:
identifying a group of user equipments (UEs) that communicates with an application being executed by an application server which controls parameters used by the group of UEs for operation in a vehicle platoon; and
controlling connectivity for one of the UEs in the group with a radio access network node responsive to characteristics of the other UEs in the group, wherein for each of the UEs the characteristic relates to a functional operation of the UE with respect to the application, wherein controlling connectivity for the one of the UEs in the group comprises:
responsive to detecting occurrence of a release trigger event associated with one of the UEs in the group, releasing a previously established group bearer and/or PDU session between the radio access network node and the application server, and which was used to carry communications between any of the UEs in the group and the application, to prevent further carrying of communications therethrough between any of the UEs and the application.

18. The network node of claim 17, further configured to perform operations of, for each of the UEs in the group, controlling admission of the UE to utilize radio resources of the radio access network node for communication with the application responsive to the characteristics of the other UEs in the group.

* * * * *